(12) United States Patent
Sato et al.

(10) Patent No.: US 6,490,509 B1
(45) Date of Patent: Dec. 3, 2002

(54) CAR CONTROLLING UNIT USING A MULTITASKING SYSTEM

(75) Inventors: Kenichiro Sato, Shioya (JP); Masaaki Takahashi, Shioya (JP); Hiroshi Ito, Shioya (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/856,046

(22) PCT Filed: May 31, 2000

(86) PCT No.: PCT/JP00/03488

§ 371 (c)(1),
(2), (4) Date: May 17, 2001

(87) PCT Pub. No.: WO01/22222

PCT Pub. Date: Mar. 29, 2001

(30) Foreign Application Priority Data

Sep. 17, 1999 (JP) .............................................. 11-263962

(51) Int. Cl.⁷ .............................. G06F 17/00; G06F 7/00
(52) U.S. Cl. ............................... 701/1; 701/36; 701/24; 180/232; 180/271; 180/337; 340/853.1
(58) Field of Search ................................. 701/1, 24, 34, 701/35, 36, 45; 180/232, 271, 337; 340/853.1

(56) References Cited

U.S. PATENT DOCUMENTS

| | | | | |
|---|---|---|---|---|
| 4,273,089 A | * | 6/1981 | Maier | 123/406.63 |
| 4,523,284 A | * | 6/1985 | Amano et al. | 123/480 |
| 4,530,056 A | * | 7/1985 | MacKinnon et al. | 180/168 |
| 5,821,879 A | * | 10/1998 | Liepmann | 340/933 |

* cited by examiner

Primary Examiner—William A. Cuchlinski, Jr.
Assistant Examiner—Olga Hernandez
(74) Attorney, Agent, or Firm—Antonelli, Terry, Stout, & Kraus, LLP.

(57) ABSTRACT

The present invention provides a multi-task system which can suppress the increase of required volume of RAM and which enables a multiplex interruption, and a car controlling unit utilizing that system. A memory area (RAM) utilized in executing a processing is divided into a task area 50 for carrying out a task processing and an interrupt area 60 for carrying out an interrupt processing. An interrupt level is given to the interrupt processing in accordance with its priority. The interrupt area is prepared so that the number thereof is same as that of the interrupt level. This system can suppress the increase of memory areas to be consumed as the interrupt area and can guarantee that all interrupt processings are operated.

7 Claims, 5 Drawing Sheets

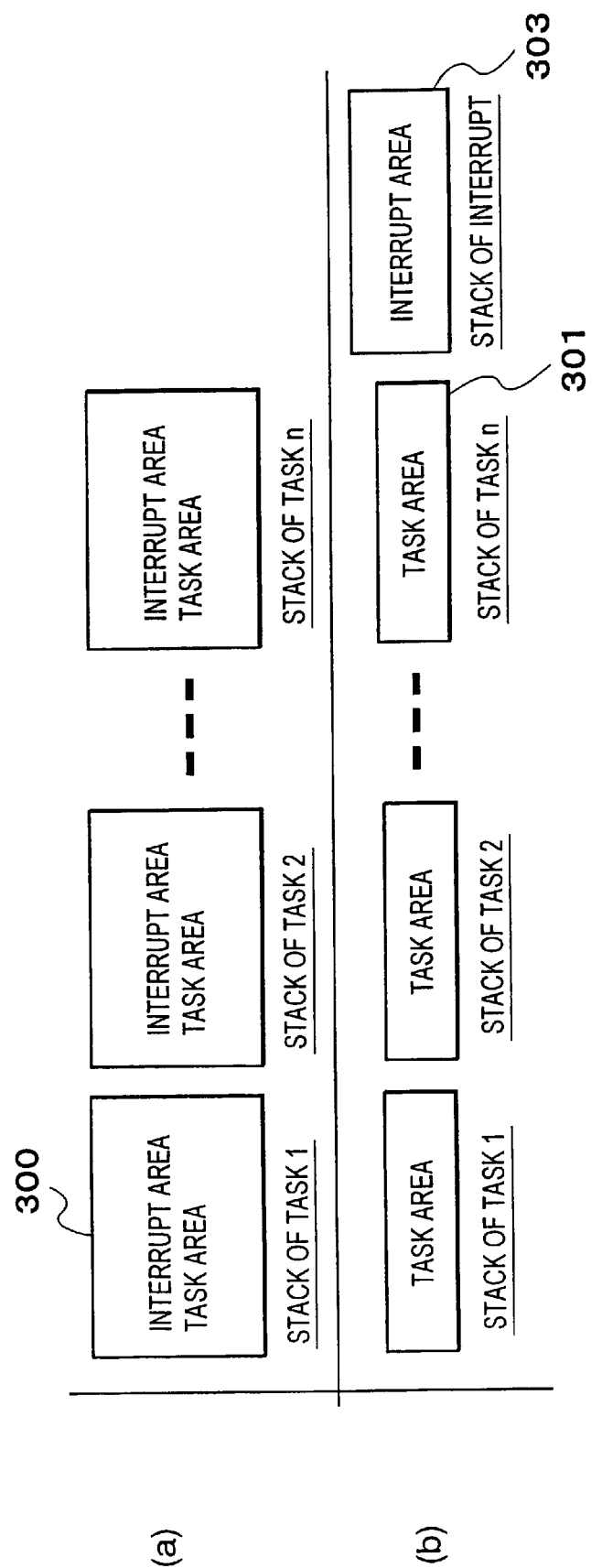

CAR CONTROLLING UNIT USING A MULTITASKING SYSTEM

TECHNICAL FIELD

The present invention relates to a technology for managing a memory of a computer unit and more specifically to a technology for managing a memory of a computer unit such as a car controlling unit whose memory capacity is limited.

BACKGROUND ARTS

A stack area 300 used by each task is reserved on RAM (Random Access Memory) per each task in a multi-task system, which processes a plurality of tasks concurrently on a computer. As shown in FIG. 5(a), a task program and an interrupt program use there served stack area 300 in general. Then, when interrupt processing occurs while executing processing of a task 1, for example, the interrupt processing utilizes an area not used by the task program in the stack area 300 for the task 1. Considered from the nature of the interrupt processing, it is required to operate reliably at any time whenever it occurs. Therefore, the task area 300 has to reserve a capacity, which enables to operate a task processing, and a capacity that enables to operate all the interrupt processing per task.

Accordingly, when a number of tasks increases, the RAM utilization efficiency drops, while the capacity of the RAM to be reserved increases. This is not a big problem for a computer with a plenty of memory. However, the above-mentioned problem is serious for a car controlling unit, which is mounted on a car, because the capacity of the RAM is limited.

Japanese Patent Laid-Open No. Hei. 123698/1996 has disclosed, as shown in FIG. 5(b), a technology of reserving in a stack area only a task area 301 per task and only one interrupt area 303 in common to all tasks. This technology enables to suppress the increase of required amount of the RAM because it is only the task area that is to be reserved anew and the interrupt area is utilized in common, even when the number of tasks increases.

DISCLOSURE OF THE INVENTION

However, when multiplex interruption is considered, this technology requires reserving areas corresponding to the maximum number of interruptions, which may occur concurrently. Therefore, the required amount of the RAM cannot be reduced.

In view of the circumstances described above, it is an object of the present invention to provide a car controlling unit that allows a multiple interrupt processing, where the increase of required amount of RAM can be suppressed.

In order to achieve the above-mentioned object, a car controlling unit comprises, interrupt request issuing means for issuing an interrupt request which is associated with one of a plurality of interrupt levels which indicates a priority of interrupt processing; an interrupt controller which receives the interrupt request and decides whether or not to allow the interrupt request based on the interrupt level associated with the interrupt request thus received; a central processing unit which executes a task processing and an interrupt processing, and when an interrupt request is allowed, the central processing unit temporarily suspends the task processing or the interrupt processing to execute the interrupt processing whose interrupt request has been allowed; and a memory having a plurality of task areas utilized as a stack by the task processing and a plurality of interrupt areas utilized as a stack by the interrupt processing, wherein, the number of the interrupt areas is equal to the number of the interrupt levels, and the central processing unit utilizes any one of the task areas as a stack in executing each of the task processings, and utilizes any one of the interrupt areas as a stack in executing the interrupt processing whose interrupt request has been allowed.

BRIEF DESCRIPTION OF THE DRAWINGS

FIG. 5 is a diagram showing a state of use of a memory in the prior art.

BEST MODE FOR CARRYING OUT THE INVENTION

In controlling a car, an appropriate control is required according to a state of a car that changes every moment. Therefore, it is difficult to monitor by a CPU (Central Processing Unit) all of the states which continue to change. Then, a plurality of controllers respectively monitor their assigned ranges, and notify the change of state to the CPU in a form of interrupt. A CPU time for carrying out a required processing is assigned to each controller. Generally, the number of interrupts, which may occur in the car controlling unit, is about 5 to 20. In such a system with a large number of interrupts and the occurrence thereof is frequent, exhaustion of memory may be serious if interrupt areas corresponding to the number of interrupts are reserved as done in conventional arts. Accordingly, it is very effective to apply the present invention to the car controlling unit.

An embodiment of the present invention applied to the car controlling unit will be explained with reference to the drawings.

Figure 1:
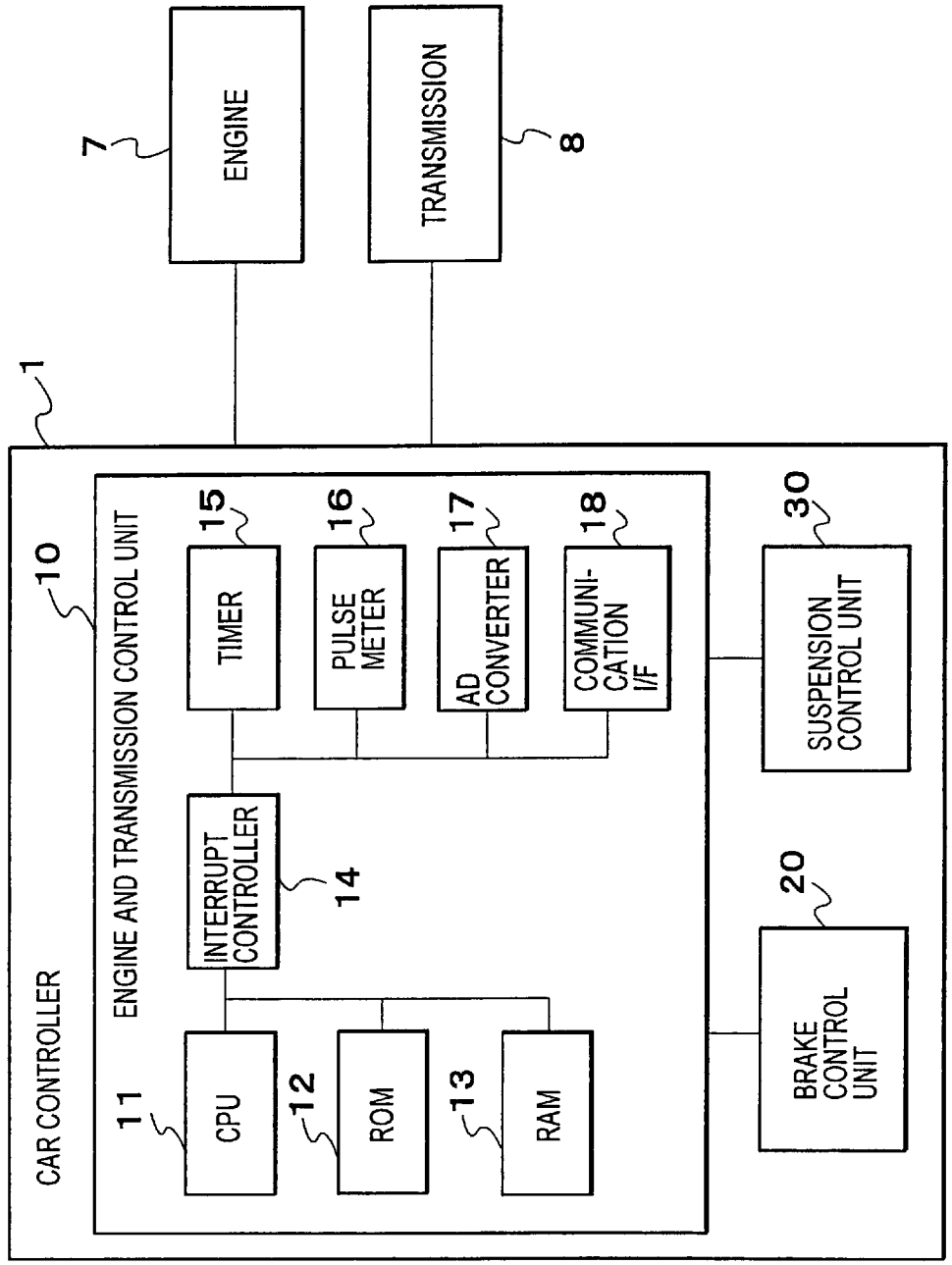
FIG. 1 is a diagram showing a functional structure of a car controlling unit to which the present invention may be applied.

A car control unit 1 is composed as a set of a plurality of control units as shown in FIG. 1. It comprises per control unit at least a CPU, a ROM (Read Only Memory), a RAM and an interrupt controller. An engine and transmission control unit 1 will be exemplified here, but it is also possible to conduct a similar memory management in other control units such as a brake control unit 20 and a suspension control unit 30.

The engine and transmission control unit 1 comprises, for example, as shown in FIG. 1, a CPU 11, a ROM 12, a RAM 13, an interrupt controller 14, a timer 15, a pulse meter 16, an AD converter 17, and a communication interface 18.

The CPU 11 executes an information processing in accordance to a program. The RAM 12 stores programs for a task processing and an interrupt processing executed by the CPU 11.

The task processing includes a task for performing a control not synchronized with engine revolutions and a task for carrying out a process for controlling the engine revolutions. More preferably, the non-synchronizing task may include a task for performing a process, which requires no synchronization with the engine revolutions or a task for carrying out a computation of parameters not influenced by the engine revolutions. These are started up by an interrupt request that occurs at constant period like a timer interrupt. Engine control tasks may include a task for controlling the engine revolutions such as an ignition-computing task for carrying out at least one of the calculating processes of engine ignition timing, fuel injection amount and injection timing. Beside those mentioned above, there are tasks such as concerning a car attitude control and concerning a transmission control.

The interrupt processing may include, for example, a periodic interrupt processing for carrying out a processing at constant intervals, and an interrupt processing for performing a control in accordance with a state of the engine. Preferably, there may be an interrupt processing, where the periodic interrupt processing is started up upon receipt of an interrupt request at constant intervals, a task is started up at constant period, or a time management is conducted. The interrupt processing for performing a control in accordance with the state of engine may include an engine rotation angle interrupt processing for carrying out a computing processing of parameters to be controlled in accordance with the engine rotation angle. Besides those mentioned above, there are interrupt processings such as concerning a car attitude control and concerning a transmission control, and a timer interrupt processing.

The RAM 13 includes a stack area utilized by each task processing and interrupt processing as a stack, and a variable area, etc. The construction of the stack area of the RAM 13 and its utilization will be described in detail later.

The interrupt controller 14 performs an interrupt control to the CPU 11, after a receipt of an interrupt inputted from the followings, i.e., a timer 15 which is a time measuring mechanism, a pulse meter 16 which receives a pulse from a pulse generator (not shown) and measure the pulse, the pulse generator monitoring a state of each part constituting a car and generating a pulse outputs, an AD converter 17 which receives an analogue output from a sensor (not shown) which monitors the aforementioned state of each part, and a communication interface 18 which communicates with other control units. The interrupt controller 14 is adaptable for multiplex interruption for receiving a plurality of interrupts concurrently. Further, an interrupt level is set in the interrupt controller 14 corresponding to a priority of interrupt processing. Here, three levels from Level 1 to Level 3 are set as the interrupt level. It is indicated that the greater the number of the interrupt level, the higher the priority is. When an interrupt request with an interrupt level higher than that of the interrupt processing being executed is made, the interrupt controller 14 allows the CPU 11 to execute the interrupting processing with a higher priority of interrupt level by suspending the interrupt processing being executed.

The interrupt level may be set as the following for example. A priority of the interrupt processing for a control in accordance with the state of the engine described above is normally higher than that of the above-mentioned periodic interrupt processings. Therefore, the interrupt level of the interrupt processing relating to the engine control is made higher. In the concrete, the interrupt level of the timer interrupt processing which receives interrupt requests at a constant interval may be set as 1 and the engine rotation angle interrupt processing may be set as 3.

The timer 15 generates a timer interrupt every constant period of time. The pulse meter 16 receives a pulse generated by the pulse generator not shown. The pulse generator generates a pulse corresponding to a rotation angle of a rotary member whose rotation angle and rotation speed need to be controlled. For example, the pulse generator is mounted on a crank of an engine or a gear of a transmission to generate the pulse corresponding to its crank angle or gear angle. Then, the pulse meter 16 requests a predetermined interrupt processing to the interrupt controller 14 in response to the pulse thus received. The AD converter 17 monitors the state of each part constituting the car and receives a measured value of a sensor, not shown, which outputs an analog output. For instance, the AD converter 17 receives measured values from a water temperature sensor of the engine and an oil temperature sensor of the transmission, etc. Then, the AD converter 17 requests a predetermined interrupt processing to the interrupt controller when the sensor completes the measurements. The AD converter 17 may also request an interrupt processing in accordance with types and values of the measured values thus received. An interrupt request from other control units such as a brake control unit 20 is inputted to the interrupt controller 14 via the communication interface 18.

Next, a memory structure of the present embodiment will be explained.

Figure 2:
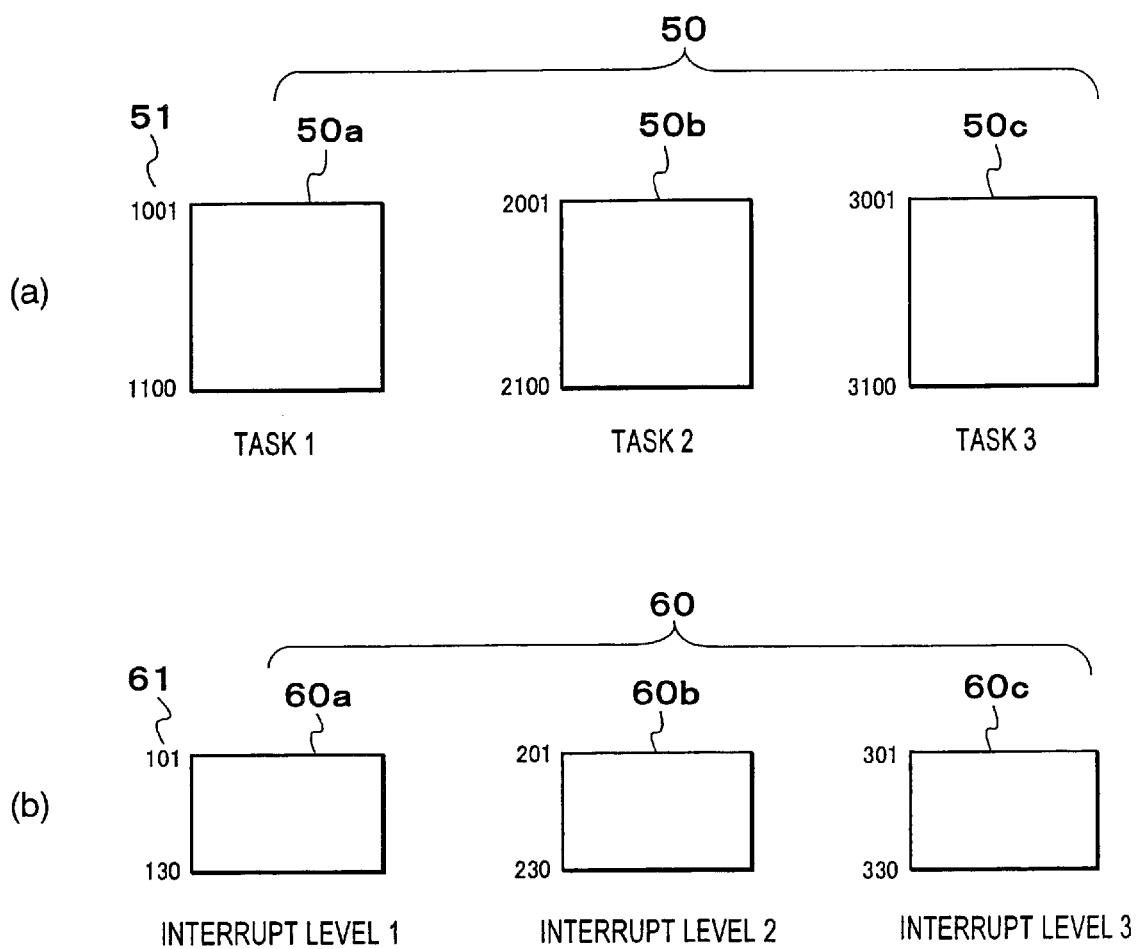
FIG. 2 is a diagram showing a state of use of the memory of the present invention.

FIG. 2 diagrammatically shows a state of use of the stack area of the RAM 13 in executing a task. FIG. 2(a) shows the structure of a task area 50, which is a stack area used by the task. The number of tasks is determined in advance and the task areas 50 corresponding to the number of tasks are reserved. Each task utilizes as a stack area the task area 50 that is allocated to each own task. FIG. 2(a) shows a state in which there exist three tasks. Here, it is indicated that an address 51 of each task area 50 (50a, 50b, 50c) is set as 1001 to 1100 for the area of the task 1, 2001 to 2100 for the area of the task 2 and 3001 to 3100 for the area of the task 3. 1100, 2100 and 3100 are called as a base address 51a of the memory area for each task.

FIG. 2(b) shows a structure of an interrupt area 60, which is a stack area used by an interrupt processing. The number of interrupt areas 60 being reserved is same as that of the interrupt level. Here, since there are three interrupt levels, there are three interrupt areas (60a, 60b, 60c). The base addresses 61a of the interrupt areas 60 are 130, 230 and 330, respectively.

The number of interrupt areas 60 is set equal to the number of interrupt levels by the following reasons. That is, when a different interrupt processing occurs while one interrupt processing is being carried out, the interrupt controller 14 allows the interrupt processing which occurs later to be executed only when the level of interrupt processing which occurs later is higher than the interrupt level of the interrupt processing currently being executed. When the interrupt level of the processing occurs later is equal to or lower than the interrupt level of the processing being executed, the interrupt controller 14 causes that processing to wait until when the interrupt processing being executed ends. Accordingly, in the multiplex interrupt system provided with interrupt levels, the maximum number of the interrupt processings that may occur concurrently is equal to the number of interrupt levels. Accordingly, a normal operation is guaranteed, even though an interrupt processing occurs in any case and at any time, just by reserving the interrupt areas 60 the number of which corresponds to the number of interrupt levels.

Figure 3:
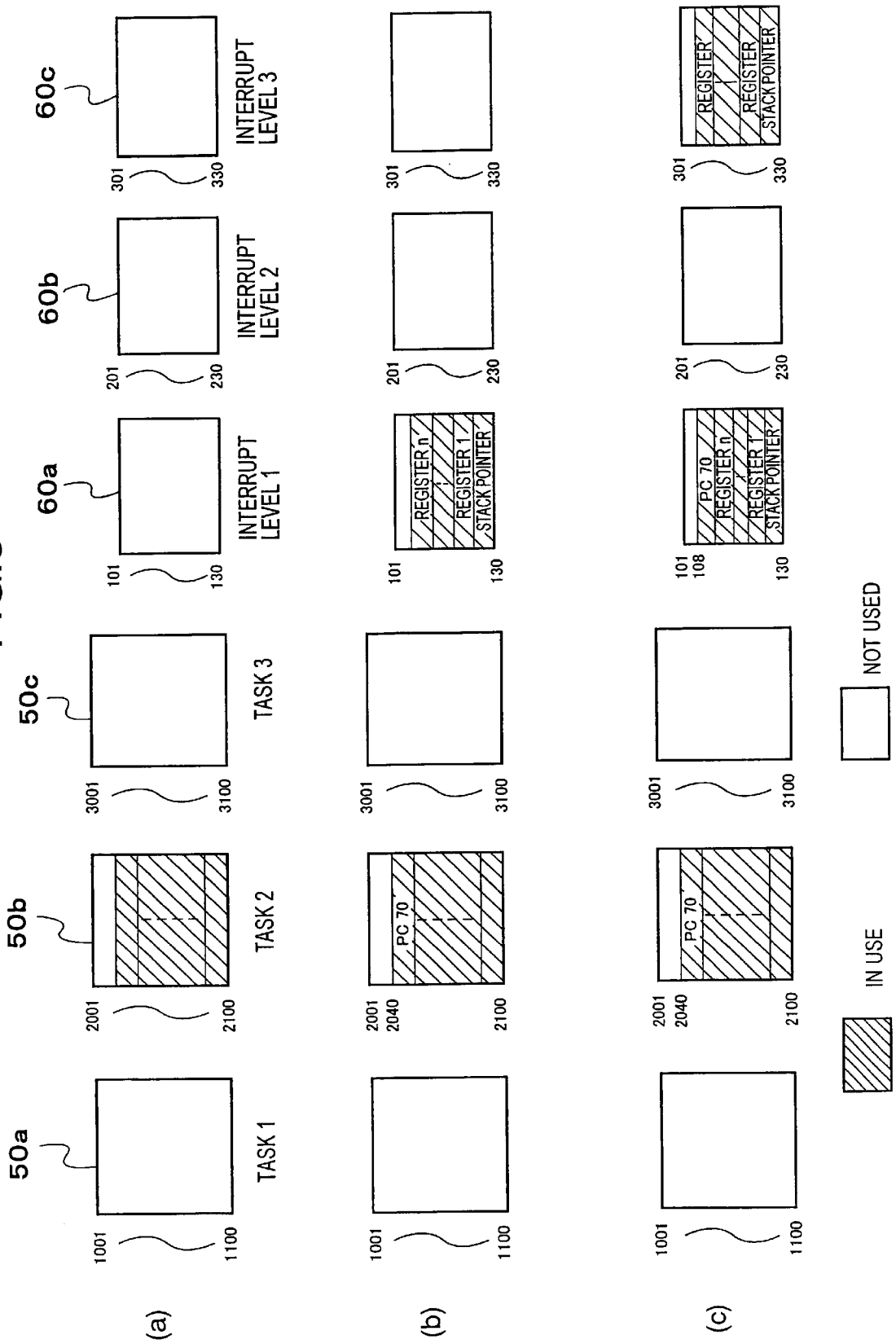
FIG. 3 is a transition diagram of a state of use of the memory of the present invention.
Figure 4:
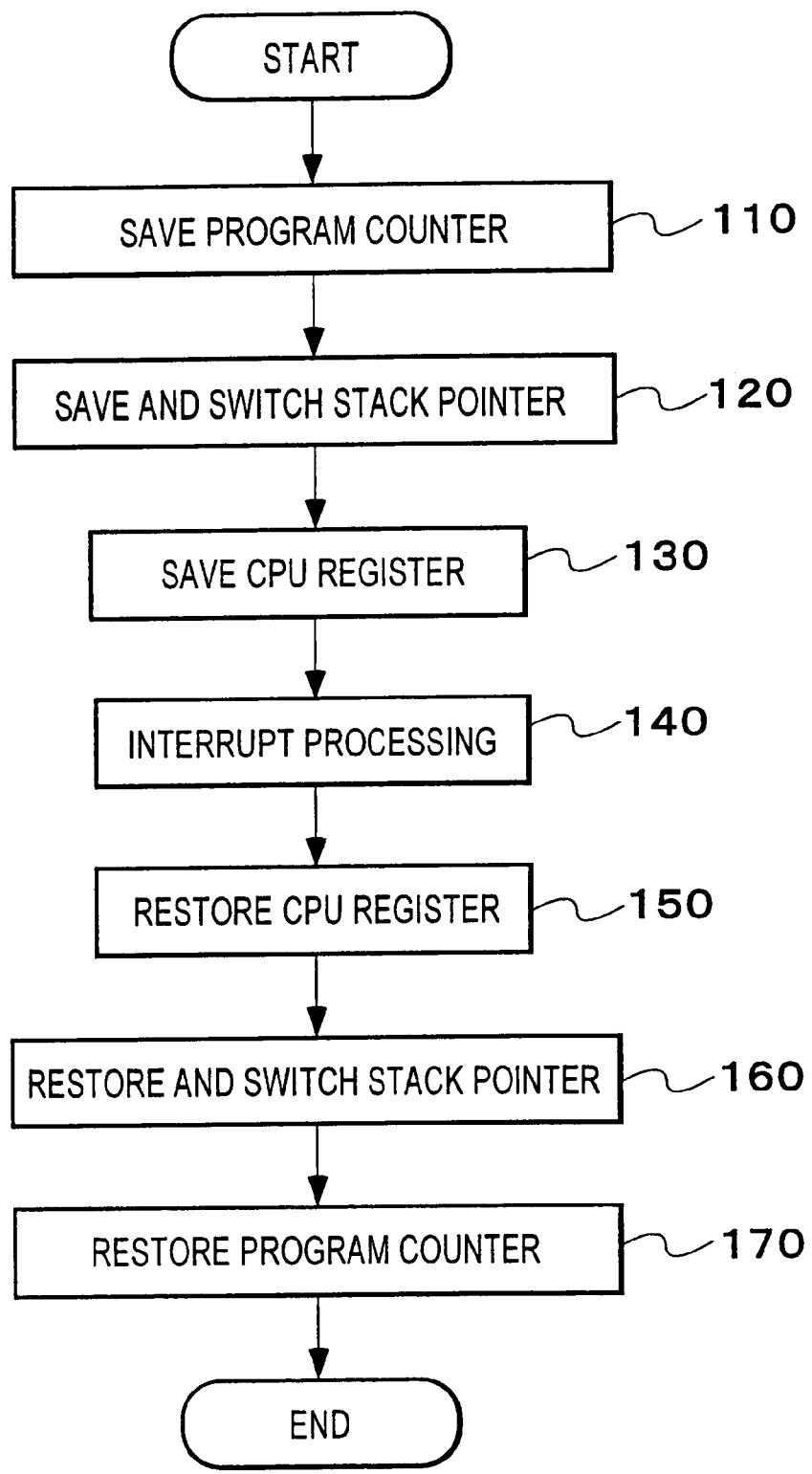
FIG. 4 is a flowchart explaining a memory managing method of the present invention.

Next, a manner of transition in the state of using a memory will be explained referring to FIGS. 3 and 4.

FIG. 3(a) shows a state in which there are three tasks, and the task 2 is being executed. At this time, no interrupt processing is occurring. Accordingly, none of the interrupt areas 60 are used.

FIG. 3(b) shows the state in which an interrupt processing A with the interrupt level 1 occurs while the task 2 is being executed as shown in FIG. 3(a). FIG. 4 shows a procedure of memory management for this case. That is, when the interrupt controller 14 allows the interrupt, the processing of the task 2 being executed at that point of time is suspended. Then, a program counter 70 (PC) at that point of time is saved in the task area 50b for the task 2 (Step 110). The CPU 11 once saves the present contents (2040) of a stack pointer, not shown, in a register, not shown, then, switches the stack pointer by setting the base address 61a (130) of the interrupt area 60a to the stack pointer. Then, the CPU 11 stores the contents (2040) corresponding to the stack pointer having been saved in the register, into the interrupt area 60a for the interrupt level 1 (Step 120). After that, the CPU11 saves the contents of the register, which has been used by the task 2, to the interrupt area 60a (Step 130). Then, the interrupt processing A is executed (Step 140).

Here, assume that an interrupt processing B with the interrupt level 3 further occurs while the interrupt processing A is being executed. At this time, the interrupt processing B is allowed to be executed because its priority is higher than that of the interrupt processing A. Then, the CPU 11 suspends the interrupt processing A, saves the program counter 70 (PC) at this time (Step 110), saves the contents (108) of the stack pointer for switching (Step 120), and saves the contents of the register to the interrupt area 60c for the interrupt level 3 (Step 130). Then, the interrupt processing B is executed (Step 140). FIG. 3(c) shows a using state of the RAM 12 at this time.

When the interrupt processing B ends, the CPU 11 restores the contents of the register from the interrupt area 60c (Step 150). It then restores the stack pointer, which has been saved to the interrupt area 60c, and performs switching (Step 160). It restores the program counter (Step 170) and resumes the interrupt processing A which has been suspended. FIG. 3(b) shows the using state of the RAM 12.

Then, when the interrupt processing A ends, the CPU 11 restores the contents of the register from the interrupt area 60a (Step 150) and restores and switches the stack pointer (Step 160). After that, the CPU 11 restores the program counter (Step 170) and resumes to process the processing that has been suspended, i.e. the task 2. FIG. 3(a) shows the using state of the RAM 12 at this time.

As described above, a normal processing is guaranteed against any interruption by reserving interrupt areas the number of which corresponds to the number of the interrupt levels. That is, since it is not necessary to reserve the interrupt areas corresponding to all interrupt processings as disclosed in the conventional art, the increase of the required volume of the RAM may be suppressed. This is particularly significant for the car controlling unit.

As described above, according to the present invention, it is possible to provide a car controlling unit, which can suppress the increase of required volume of RAM, and enables multiplex interrupt processings.

What is claimed is:

1. A car controlling unit, comprising:
   interrupt request issuing means for issuing an interrupt request being associated with one of a plurality of interrupt levels, which indicates a priority of an interrupt processing;
   an interrupt controller which receives said interrupt request and decides whether or not said interrupt request is allowed, based on the interrupt level associated with said interrupt request thus received;
   a central processing unit which executes a task processing and an interrupt processing, and which suspends the task processing or the interrupt processing being executed when said interrupt request has been allowed, so as to execute said interrupt processing whose interrupt request has been allowed; and
   a memory having a plurality of task areas to be used as a stack by said task processing and a plurality of interrupt areas to be used as a stack by interrupt processing, wherein,
      a number of said interrupt areas is equal to a number of said interrupt levels;
      said central processing unit utilizes any one of said task areas as a stack in executing each of said task processing; and
      said central processing unit utilizes any one of said interrupt areas as a stack in executing said interrupt processing whose interrupt request has been allowed.

2. The car controlling unit according to claim 1, further comprising,
   monitoring means for monitoring a state of a car, wherein, said interrupt request issuing means issues said interrupt request based on a result of monitoring by said monitoring means.

3. The car controlling unit according to claim 2, wherein said monitoring means is a pulse generator which generates a pulse corresponding to a rotation angle of a rotary member whose rotation angle or rotation speed is to be controlled; and
   said interrupt request issuing means is a pulse meter which receives the pulse from said pulse generator and issues the interrupt request in accordance with the pulse thus received.

4. The car controlling unit according to claim 2, wherein said monitoring device is a sensor which measures the state of the car and outputs measured values in analog; and
   said interrupt request issuing means is an AD converter which receives the measured values from said sensor and issues the interrupt request when a measurement of said sensor is completed.

5. The car controlling unit according to claim 1, wherein said interrupt request issuing means is a timer.

6. The car controlling unit according to claim 1, further comprising a communication interface for communicating with other car controlling unit, wherein,
   said interrupt request issuing means issues the interrupt request to said communication interface; and
   said interrupt controller receives the interrupt request from said communication interface.

7. A car controlling unit, comprising:
   a pulse generator that generates a pulse corresponding to a rotation angle of an engine;
   a pulse meter that receives the pulse from said pulse generator, measures a number of the pulse thus received and issues an interrupt request corresponding to a result of the measurement;
   a timer for generating an interrupt request at a predetermined time interval;
   interrupt processing means comprising engine rotation angle interrupt processing means being associated with the interrupt request generated by said pulse meter, and timer interrupt processing means being associated with the interrupt request generated by said timer; and
   a memory having a plurality of interrupt areas to be utilized as a stack by said interrupt processing means; wherein the interrupt request generated by said pulse meter and the interrupt request generated by said timer are associated with one of a plurality of interrupt levels, respectively, which indicate a priority of an interrupt processing, and the interrupt request generated by said pulse meter and the interrupt request generated by said timer are associated with the interrupt levels whose priority are different from each other, and wherein, each of said interrupt areas is associated with any one of said plurality of interrupt levels in one-to-one correspondence;

said rotation angle interrupt processing means utilizes as a stack said interrupt area which is associated with the interrupt level in one-to-one correspondence, that interrupt level being associated with said rotation angle of interrupt processing means; and said timer interrupt processing means utilizes as a stack said interrupt area which is associated with the interrupt level in one-to-one correspondence, that interrupt level being associated with said timer interrupt processing.

* * * * *